Patented Aug. 31, 1937

2,091,657

UNITED STATES PATENT OFFICE 2,091,657

DYESTUFFS OF THE ANTHRAQUINONE THIO-ETHER SERIES

Berthold Stein and Walther Kuehne, Mannheim, Germany, assignors to General Aniline Works, Inc., New York, N. Y., a corporation of Delaware No Drawing. Application November 13, 1936, Serial No. 110,641. In Germany November 16, 1935

5 Claims. (Cl. 260—59)

The present invention relates to dyestuffs of the anthraquinone series.

It is already known that dyestuffs suitable for dyeing wool yellow, red, violet or blue shades can be obtained by preparing sulphonic acids of anthraquinone-thiophenyl ethers.

We have now found that especially valuable dyestuffs of the said class which dye wool very fast green shades are obtained by treating compounds having the general formula

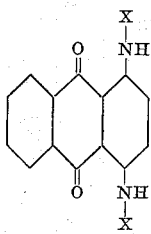

in which X is an isocyclic radical having up to two condensed rings which contain a halogen atom or a sulphonic group in a beta-position of the benzene nucleus of the anthraquinone nucleus free from amino groups, in any sequence with mercaptans of the benzene or naphthalene series and with sulphonating agents.

The dyestuffs thus obtainable yield green dyeings of excellent fastness properties on animal fibres.

The following examples will further illustrate how our said invention may be carried out in practice but the invention is not restricted to these examples. The parts are by weight.

Example 1

A mixture of 30 parts of 1,4,6-trichloranthraquinone, 100 parts of 1-methyl-4-aminobenzene and 20 parts of anhydrous sodium acetate is heated in the presence of some copper acetate at about 150° C. until the coloration of a sample withdrawn and dissolved in pyridine no longer changes. The mixture is then allowed to cool and alcohol is added whereby the 1,4-di-(4'-methylphenyl) - amino - 6 - chloranthraquinone formed is separated.

A mixture of 45 parts of the said compound, 16 parts of 1-mercapto-4-methylbenzene, 8 parts of ground potassium hydroxide and 300 parts of amyl alcohol is heated at about 130° C. until a sample withdrawn and worked up is free from chlorine. By cooling the mixture blue-green needles are obtained which are filtered off by suction and free from solvent, for example by steaming.

50 parts of the said compound are dissolved at room temperature in 400 parts of sulphuric acid monohydrate and 23 per cent fuming sulphuric acid is added until a sample withdrawn is soluble in water. The mixture is then stirred into ice-cold water and the dyestuff formed is separated in the usual manner. It dyes wool very fast green shades from an acid bath.

A similar dyestuff is obtained if the sulphonation is carried out under milder conditions, viz. by employing sulphuric acid monohydrate alone. It is somewhat more difficultly soluble in water.

Example 2

A mixture of 30 parts of 1,4,6-trichloranthraquinone, 80 parts of tetrahydro-2-aminonaphthalene and 25 parts of potassium acetate is heated at 140° C. in the presence of a little copper acetate until the color of a sample withdrawn and dissolved in pyridine no longer changes. The mixture is then diluted with alcohol, whereby beautiful green crystals separate.

A mixture of 53 parts of the compound thus obtained, 16 parts of 1-mercapto-4-methylbenzene, 8 parts of ground potassium hydroxide and 300 parts of amyl alcohol is heated at about 130° C. until a sample withdrawn is free from chlorine. The mixture is allowed to cool and the resulting compound is worked up in the usual manner.

50 parts of the compound obtained are stirred at from 50° to 60° C. into 400 parts of sulphuric acid monohydrate and the mixture is stirred until a sample withdrawn is soluble in water. The liquid is then added while stirring to ice-cold water and the dyestuff salted out. It dyes wool green shades having excellent fastness properties from an acid bath.

A similar dyestuff is obtained by using 1-amino-4-cyclohexylbenzene instead of tetrahydro-2-aminonaphthalene.

Example 3

A solution of 45 parts of 1,4-di-para-toluidino-6-chloranthraquinone in 360 parts of sulphuric acid monohydrate is mixed with 23 per cent fuming sulphuric acid until a sample has become readily soluble in water. The mass is then stirred into ice-cold water and the sulphonic acid formed is precipitated by the addition of common salt.

A mixture of 50 parts of this sulphonic acid, 12 parts of 1-methyl-4-mercaptobenzene, 5 parts of sodium hydroxide, 1000 parts of pyridine and 100 parts of water is heated under reflux to boiling until a sample of the resulting dyestuff is free from chlorine. The dyestuff is then salted out by means of common salt. It dyes wool from an acid bath very fast green shades.

The reaction may also be carried out in an aqueous alkaline medium at from 120° to 130° C. in a closed vessel.

Example 4

A mixture of 30 parts of 1,4,6-trichloranthraquinone, 105 parts of 2-aminonaphthalene, 60 parts of potassium acetate and a little copper acetate is heated at between 160 and 180° C. until the coloration of a sample dissolved in pyridine no longer changes. By stirring the mass with normal butyl alcohol, blue needles of 1,4-di-2'-naphthylamino-6-chloranthraquinone are obtained.

A mixture of 26 parts of this compound, 10 parts of 1-mercapto-4-methylbenzene, 5 parts of potassium hydroxide and 200 parts of aniline is heated at from 160° to 170° C. until a sample is free from chlorine. The 1,4-di-2'-naphthylamino-6-thiocresylanthraquinone formed is precipitated by adding butanol to the reaction mixture.

10 parts of this compound are dissolved in 80 parts of concentrated sulphuric acid and the solution is allowed to stand until a sample has become readily soluble in water. The dyestuff formed is separated in the usual manner. It dyes wool from an acid bath very fast green shades.

*Example 5*

A mixture of 45 parts of 1,4-di-para-toluidino-6-chloranthraquinone, 20 parts of 2-mercaptonaphthalene, 7 parts of potassium hydroxide and 100 parts of aniline is heated at from 165° to 170° C. until a sample is free from chlorine. After the addition of 150 parts of butanol 1,4-di-para-toluidino-6-(2'-thionaphthyl)-anthraquinone separates.

A solution of 10 parts of this compound in 80 parts of sulphuric acid monohydrate is allowed to stand for some time. As soon as a sample has become readily soluble in water the whole mixture is poured on to 200 parts of ice and the sulphonic acid precipitated is isolated in the usual manner. It dyes animal fibers from an acid bath very fast green shades.

What we claim is:—

1. Dyestuffs of the anthraquinone series corresponding to the general formula

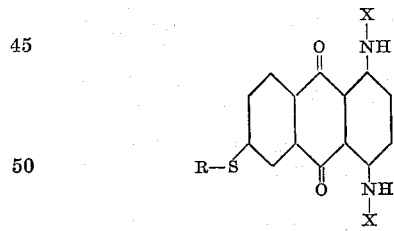

wherein R stands for an aryl radical having up to two condensed isocyclic rings and X for an isocyclic radical having up to two condensed rings, and wherein at least one of the radicals marked R and X contains a sulphonic acid group.

2. Dyestuffs of the anthraquinone series corresponding to the general formula

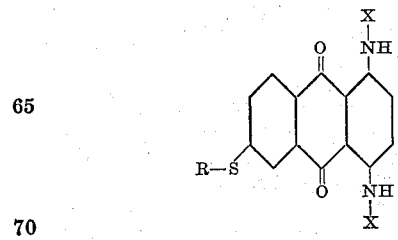

wherein R and X stand for radicals of the benzene series at least one of which contains a sulphonic acid group.

3. The dyestuff of the anthraquinone series having the formula

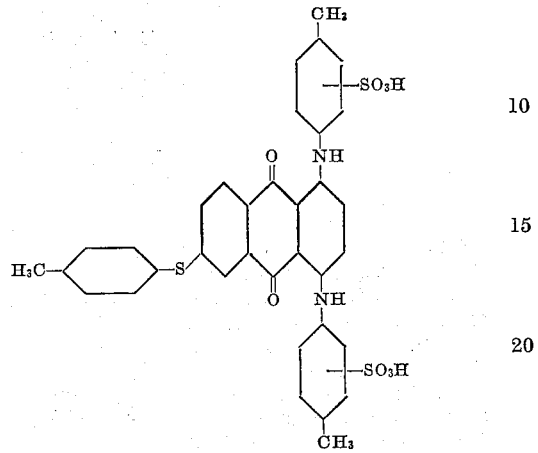

4. The dyestuff of the anthraquinone series having the formula

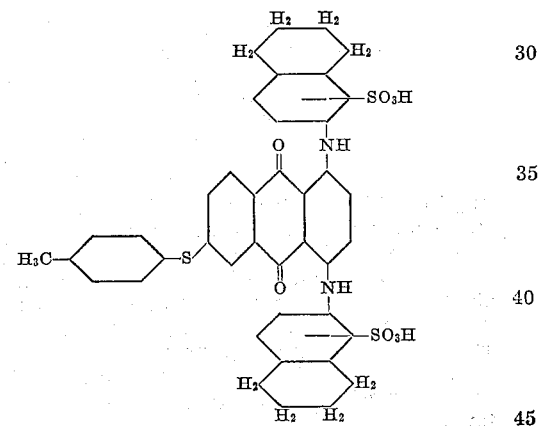

5. The dyestuff of the anthraquinone series having the formula

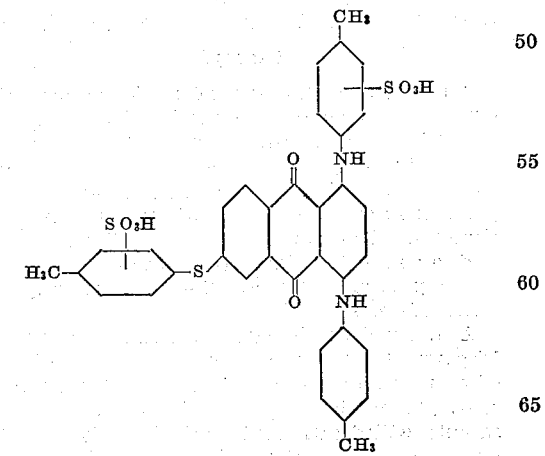

BERTHOLD STEIN.
WALTHER KUEHNE.